(12) United States Patent
Lu et al.

(10) Patent No.: US 11,616,442 B2
(45) Date of Patent: Mar. 28, 2023

(54) INDUCTOR CURRENT DEPENDENT PULSE WIDTH MODULATOR IN A SIMO CONVERTER

(71) Applicant: Analog Devices International Unlimited Company, Limerick (IE)

(72) Inventors: Danzhu Lu, Shanghai (CN); Langyuan Wang, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 143 days.

(21) Appl. No.: 17/325,028

(22) Filed: May 19, 2021

(65) Prior Publication Data

US 2021/0408908 A1    Dec. 30, 2021

Related U.S. Application Data

(60) Provisional application No. 63/046,272, filed on Jun. 30, 2020.

(51) Int. Cl.
  *H02M 3/158*   (2006.01)
  *H02M 1/00*    (2006.01)

(52) U.S. Cl.
  CPC .......... *H02M 3/158* (2013.01); *H02M 1/009* (2021.05); *H02M 1/0009* (2021.05); *H02M 3/1582* (2013.01)

(58) Field of Classification Search
  CPC ............. H02M 1/0003; H02M 1/0009; H02M 1/0025; H02M 1/009; H02M 3/157; H02M 3/158; H02M 3/1582
  See application file for complete search history.

(56) References Cited

U.S. PATENT DOCUMENTS 6,949,915 B2    9/2005  Stanley
7,880,456 B2    2/2011  Falvey et al.
                        (Continued)

FOREIGN PATENT DOCUMENTS

CN    102882371 B    1/2016
CN    106787719 A    5/2017
                     (Continued)

OTHER PUBLICATIONS

Chen, Chih-Wei, "Dual-frequency single-inductor multiple-output (DF-SIMO) power converter topology for SoC applications", Iowa State University Graduate Theses and Dissertations, 14329, (2015), 99 pgs.

(Continued)

*Primary Examiner* — Matthew V Nguyen
(74) *Attorney, Agent, or Firm* — Schwegman Lundberg & Woessner, P.A.

(57) ABSTRACT

A switching power converter circuit comprises a single inductive circuit element; a common control loop circuit coupled to a circuit input and the inductive circuit element and including switching circuit elements to charge the inductive circuit element using energy provided at the circuit input; at least one current sensing circuit configured to sense inductor current of the inductive circuit element; one or more output control loop circuits that each include switching circuit elements activated to generate an output voltage; and one or more pulse width modulation (PWM) circuits configured to generate a PWM control signal to activate the switching circuit elements of the output control loop circuits and to change a peak voltage of the PWM control signal of the one or more PWM circuits according to the inductor current.

20 Claims, 4 Drawing Sheets

(56) References Cited

U.S. PATENT DOCUMENTS

| | | | |
|---|---|---|---|
| 8,106,642 B2 | 1/2012 | Chen et al. | |
| 8,258,767 B2 * | 9/2012 | Wu | H02M 3/158 |
| | | | 323/284 |
| 8,330,439 B2 | 12/2012 | Wu | |
| 8,624,429 B2 | 1/2014 | Jing et al. | |
| 8,780,590 B2 | 7/2014 | So et al. | |
| 8,816,657 B2 | 8/2014 | Wang | |
| 8,866,463 B2 | 10/2014 | Latham, II et al. | |
| 8,878,501 B2 | 11/2014 | Kalje et al. | |
| 9,407,145 B1 | 8/2016 | Burstein et al. | |
| 9,584,029 B2 | 2/2017 | Zane et al. | |
| 9,762,132 B2 | 9/2017 | Freeman et al. | |
| 10,505,454 B2 | 12/2019 | Zhao et al. | |
| 11,515,786 B2 * | 11/2022 | Guo | H02M 3/156 |
| 2013/0082668 A1 * | 4/2013 | Tseng | H02M 3/158 |
| | | | 323/267 |
| 2022/0037997 A1 * | 2/2022 | Liang | H03F 3/2178 |

FOREIGN PATENT DOCUMENTS

| | | | |
|---|---|---|---|
| EP | 2267572 A1 | 12/2010 | |
| EP | 2350763 B1 | 9/2017 | |
| JP | 2014011888 | * 1/2014 | ............ H02M 3/155 |

OTHER PUBLICATIONS

Kim, Hak-Yun, et al., "Dual-mode Inverting Buck-boost Converter using Set-time Variable PWM Method", Journal of Semiconductor Technology and Science, 18(4), (Aug. 2018), 423-432.

Ma, Geng-Fei, et al., "A Monolithic Current-Mode Buck Converter With Advanced Control and Protection Circuits", IEEE Transactions on Power Electronics, 22(5), (Sep. 2007), 1836-1846.

Solis, Carlos J, "Battery-Sourced Switched-Inductor Multiple-Output CMOS Power-Supply Systems", PhD Dissertation, Georgia Institute of Technology, (May 2018), 207 pgs.

* cited by examiner

US 11,616,442 B2

INDUCTOR CURRENT DEPENDENT PULSE WIDTH MODULATOR IN A SIMO CONVERTER

CLAIM OF PRIORITY

This application claims the benefit of priority to U.S. Provisional Application Ser. No. 63/046,272, filed Jun. 30, 2020, which is hereby incorporated by reference herein in its entirety.

BACKGROUND

Electronic systems can include devices that require a regulated power source. Power circuits can be used to provide a circuit supply rail having a regulated voltage. It is desirable for power circuits to reliably perform regulation over varying operating parameters. The present inventors have recognized a need for improved performance of power circuits.

SUMMARY OF THE DISCLOSURE

This document relates generally to switching power converters and methods of their operation. An example of a switching power converter includes a single inductive circuit element, a common control loop circuit coupled to a circuit input and the inductive circuit element and including switching circuit elements to charge the inductive circuit element using energy provided at the circuit input, at least one current sensing circuit configured to sense inductor current of the inductive circuit element, one or more output control loop circuits that each include switching circuit elements activated to generate an output voltage, and one or more pulse width modulation (PWM) circuits configured to generate a PWM control signal to activate the switching circuit elements of the output control loop circuits and to change a peak voltage of the PWM control signal of the one or more PWM circuits according to the inductor current.

An example of a method of operating a single-inductor multiple-output switching power converter circuit includes charging an inductive circuit element using energy provided at an input port using a common control loop circuit, generating multiple output voltages using energy of the inductive circuit element using multiple output control loop circuits, activating switching circuit elements of the output control loop circuits according to pulse width modulation using a control signal to regulate an output voltage of each of the output control loop circuits, and changing a peak voltage of the control signal according to inductor current of the inductive circuit element.

An example of a single-inductor multiple-output switching converter circuit includes a single inductive circuit element, a current sensing circuit configured to sense inductor current of the inductive circuit element, and multiple output control loop circuits coupled to the inductive circuit element and configured to generate positive and negative output voltages using energy stored in the inductive circuit element. Each output control loop circuit includes a pulse width modulator circuit configured to regulate the output voltage of the output control loop circuit using a sawtooth reference signal, and set the peak voltage of the sawtooth reference signal to be inversely proportional to the sensed inductor current.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Power circuits may need to provide a fixed or stable output voltage as an electrical circuit supply for an electronic system. Some power circuits are switching power circuits that convert the input voltage to a regulated output voltage. The regulated voltage conversion can provide a regulated output voltage that is higher than the input voltage of the regulator, lower than the input voltage, or inverted from the input voltage. The regulation is typically achieved by recurrently charging an inductor from an energy source and then discharging the energy of the inductor to drive a load. The charging and discharging can be accomplished using electronic switches that include transistors. More complicated electronic systems may require multiple circuit supply voltages. An approach to providing multiple voltages is to use a switching power converter circuit having a multiple-inductor multiple-output (MIMO) topology. The MIMO approach typically requires a large circuit area due to the multiple inductors being discrete components. Another approach is to use a switching power converter circuit having a single-inductor multiple-output (SIMO) topology. This reduces the circuit area required, but there can be challenges in optimizing performance of SIMO circuits.

Figure 1:
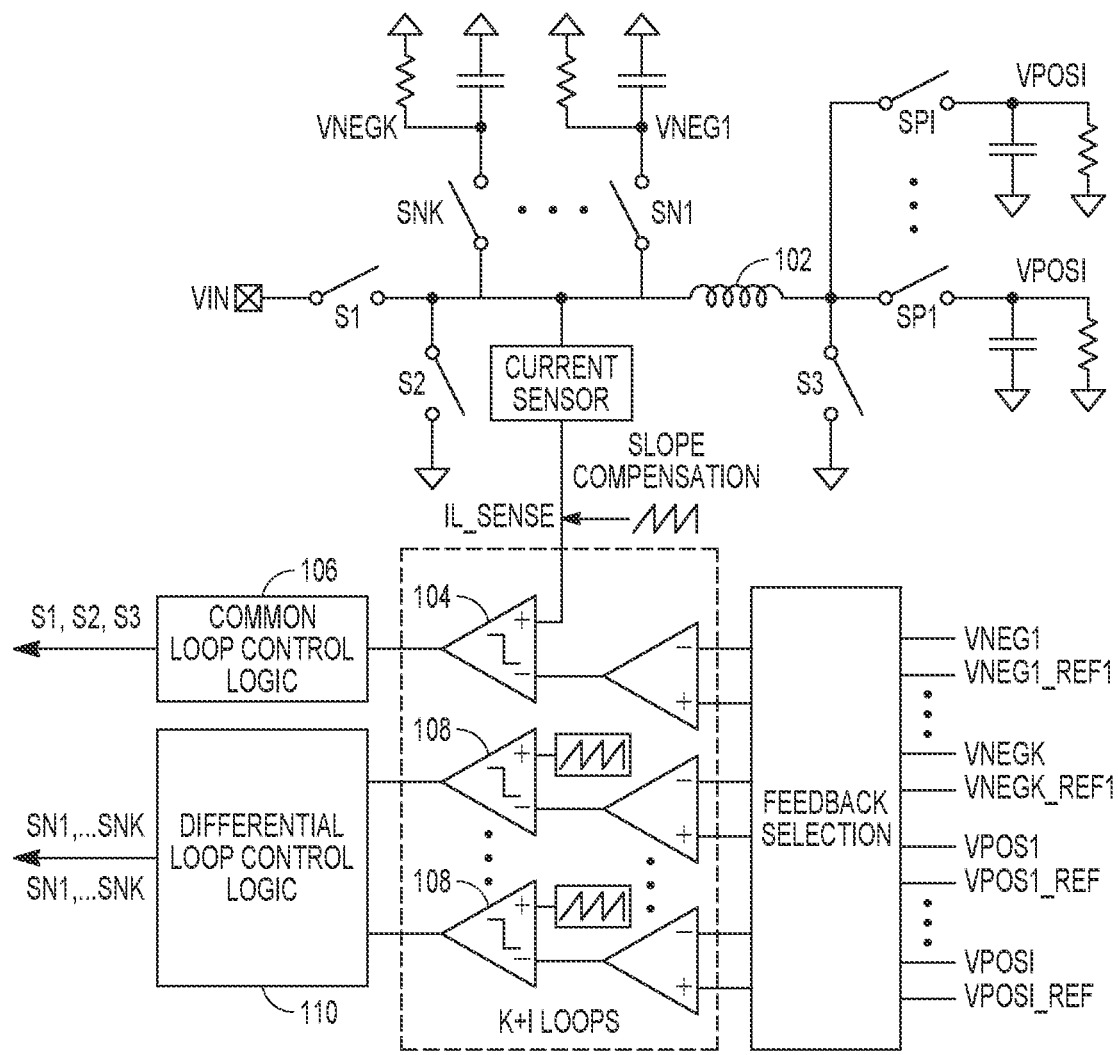
FIG. 1 is a circuit diagram of an example of a single-inductor multiple-output (SIMO) switching power converter circuit.

FIG. 1 is a circuit diagram of an example of a SIMO switching power converter circuit. The circuit includes a single inductor 102 and the circuit generates multiple output voltages using energy stored by the inductor 102. The output voltages generated in the example of FIG. 1 include k negative voltages (Vneg1 . . . Vnegk) and i positive voltages (Vpos1 . . . Vposi) and the circuit includes k+i output control loop circuits to generate the k+i output voltages.

An issue with the SIMO switching power converter circuit of FIG. 1 is that the gain bandwidth of the output or outputs changes with load current. This can result in the SIMO switching power converter being unstable under heavy load.

Figure 2:
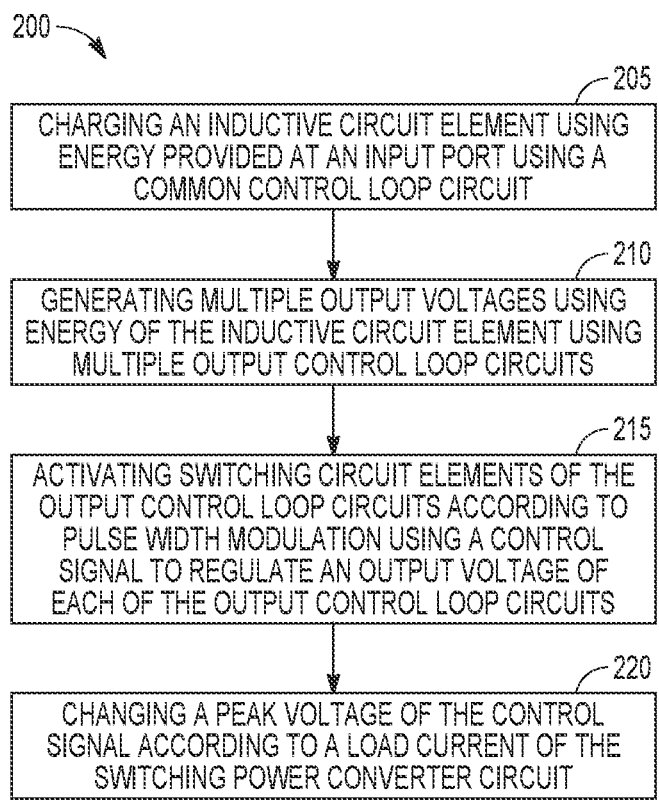
FIG. 2 shows a flow diagram of a method of operating a power converter circuit.

FIG. 2 is a flow diagram of a method of operating a SIMO switching power converter circuit, such as the circuit of FIG. 1 for example. At 205, an inductive circuit element (e.g., inductor 102 of FIG. 1) is charged by a common control loop circuit using energy provided at the input port (Vin). In FIG. 1, the common control loop circuit includes comparator 104 and common loop control logic circuitry 106 to control switching circuit elements S1, S2, and S3 that are coupled to the inductive circuit element. At 210, multiple output voltages are generated from the energy of the inductive circuit element using multiple output control loop circuits (e.g., the k+i output control loop circuits of FIG. 1).

In some aspects, the output control loop circuits are differential control loop circuits that generate multiple positive and negative voltages that can be used as supply voltages for differential circuits, and the common loop circuit generates a common mode voltage. The output control loop circuits include k+i comparators 108 and differential loop control logic circuitry 110 to control activation of switching elements Sp1 . . . Spi to generate positive voltages Vpos1 . . . Vposi and switching elements Sn1 . . . Snk to generate positive voltages Vneg1 . . . Vnegk.

At 215, the output control loop circuits and the common control loop circuits use pulse width modulation (PWM) to control the switching circuit elements. A control signal is provided to the switching circuit elements that includes signal pulses. In PWM, the duty cycle of the pulses is modulated to regulate the outputs to meet the output voltage targets. The duty cycle is modulated using a sawtooth reference signal.

The gain bandwidth (GBW) for a differential loop of the SIMO switching power converter circuit is $$GBW = \frac{I_L}{C\left(1 + D\frac{V_{in} - V_{outp} - V_{outn}}{V_{in}}\right)}$$

where $I_L$ is the average inductor current, Vin is the input voltage, Voutp is the output voltage, Voutn is the negative output voltage, C is the output capacitance, and D is the duty cycle. It can be seen that the GBW of the differential loop is proportional to the inductor current.

At 220, the peak voltage of a control signal used for PWM is changed according to the inductor current. The PWM circuitry provides a transfer function (Fmd) to the overall transfer function of the differential loop. The PWM circuitry can be designed so that the transfer function Fmd includes the inverse of the peak voltage amplitude of the sawtooth reference (e.g., 1/Vpp). If the peak voltage Vpp of the sawtooth reference is adjusted based on the inductor current, the sensitivity of the GBW of the differential loop of the SIMO to load current can be reduced. If the peak voltage of the sawtooth reference signal is proportional to the inductor current, the GBW can be made insensitive to load current.

Figure 3:
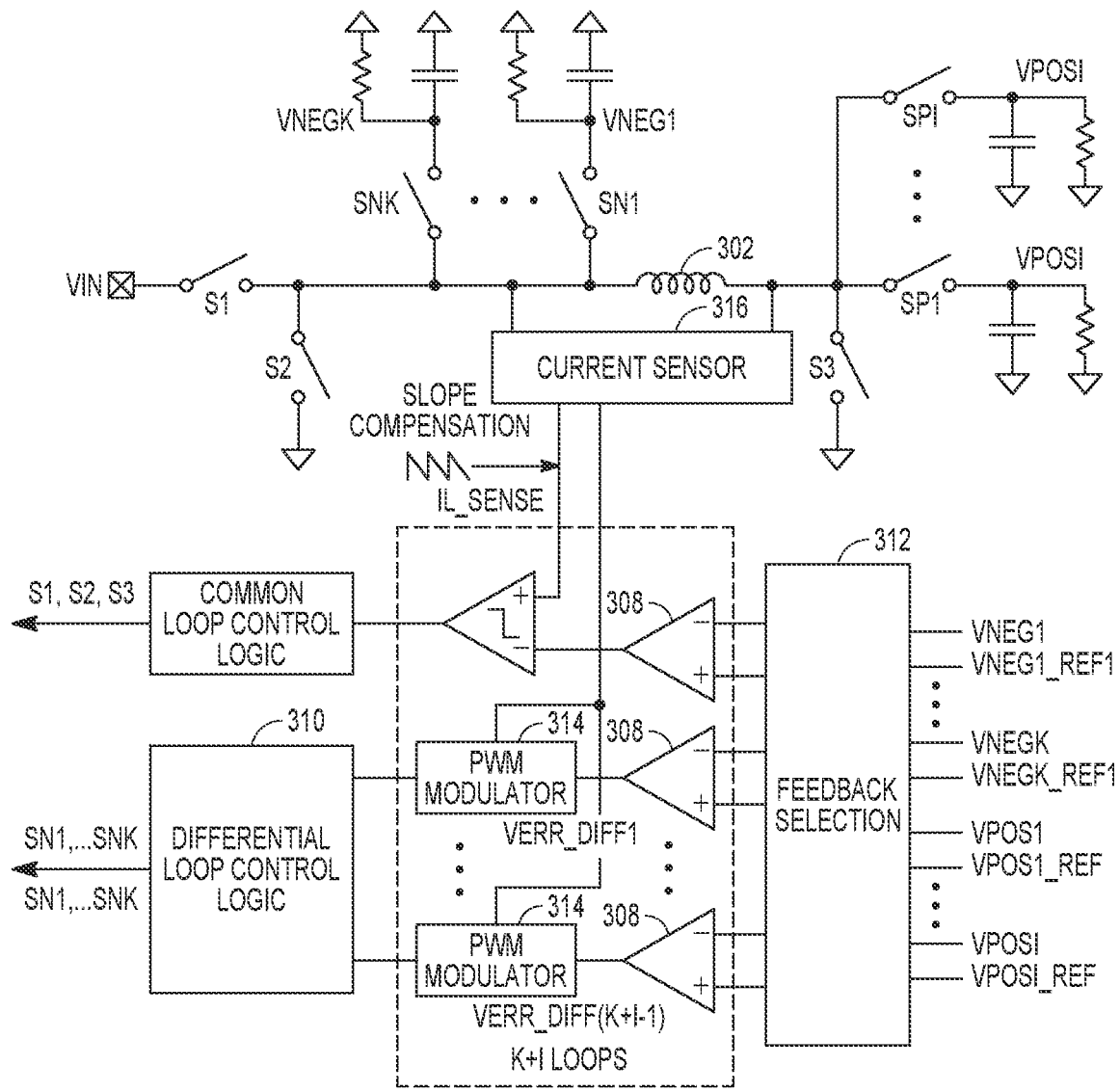
FIG. 3 is a circuit diagram of another example of a SIMO switching power converter circuit.

FIG. 3 is a circuit diagram of another example of a SIMO switching power converter circuit. Like the example in FIG. 1, the SIMO switching power converter circuit includes a common control loop circuit coupled to the input Vin and the inductor 302, and includes output control loop circuits to generate multiple output voltages. Each of the output control loop circuits is coupled to differential loop control logic circuitry 310 to control activation of switching elements Sp1 . . . Spi to generate positive voltages Vpos1 . . . Vposi and switching elements Sn1 . . . Snk to generate positive voltages Vneg1 . . . Vnegk.

Each of the output control loop circuits includes an error amplifier 308 and is coupled to feedback selection circuitry 312 to apply an output voltage and a reference voltage (Vpos1_ref . . . Vposi_ref, Vneg1_ref . . . Vnegk_ref) to the error amplifiers 308. The error amplifiers output a voltage proportional to the error between the output voltage and the reference voltage. In an example, the feedback selection circuitry 312 includes multiplexing circuitry that selectively applies the voltages to the error amplifiers 308. Each of the output control loop circuits includes a PWM circuit 314 that generates a PWM control signal to control the switching circuit elements of the output control loop circuit to regulate the output voltage. The SIMO switching power converter circuit includes current sensors 316 to monitor the inductor current. Based on the sensed inductor current and the error between the feedback voltage and the reference voltage, the PWM circuits adjust the PWM control signal to reduce sensitivity of the GBW to load current.

Figure 4:
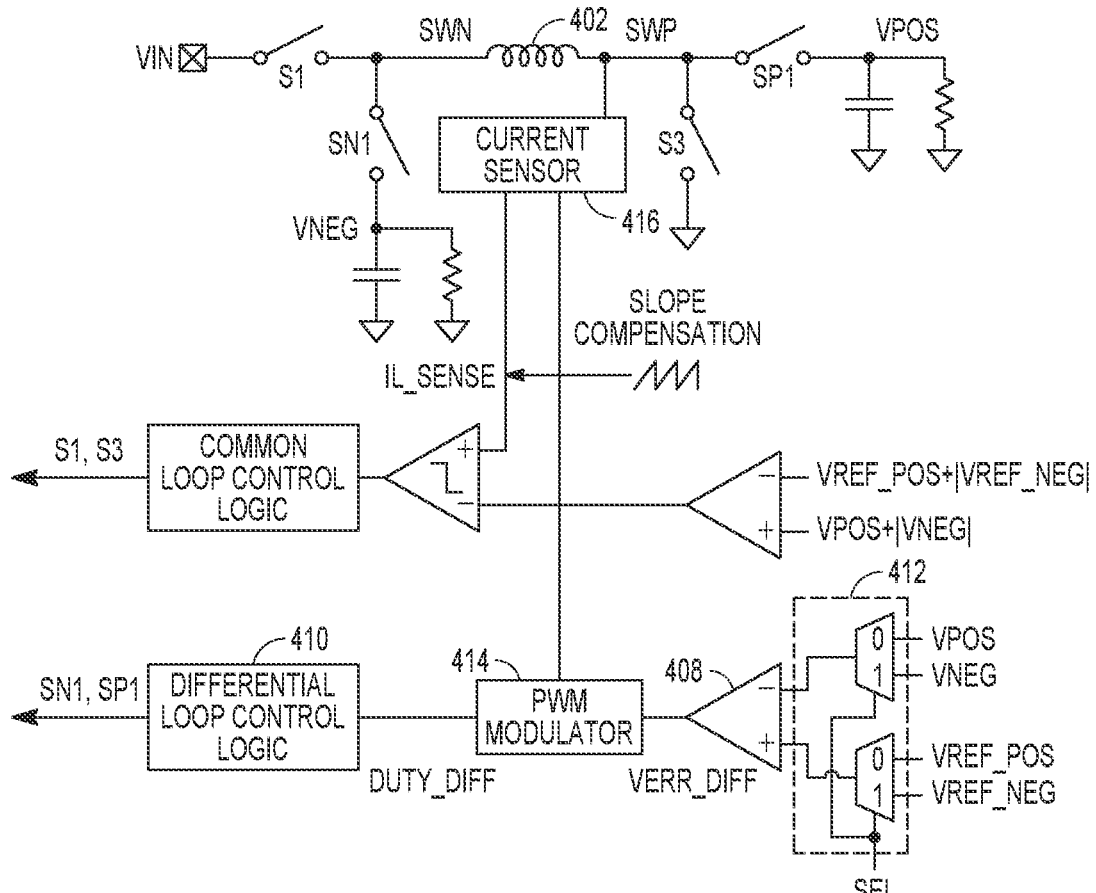
FIG. 4 is a circuit diagram of another example of a SIMO switching power converter circuit.

FIG. 4 is a circuit diagram of another example of a SIMO switching power converter circuit. The circuit of FIG. 4 is simplified to include one differential control loop circuit that includes PWM circuit 414. Common loop control logic circuitry 406 controls switches S1 and S3, and the differential loop control logic circuitry 410 controls switches Sn1 and Sp1 to generate negative voltage Vneg and Vpos from charge stored by the inductor 402 The voltages Vneg and Vpos may be negative and positive supply rails for an electrical circuit supply. Current sensor 416 monitors the inductor current and the PWM circuit 414 adjusts the PWM control signal based on the inductor current.

Figure 5:
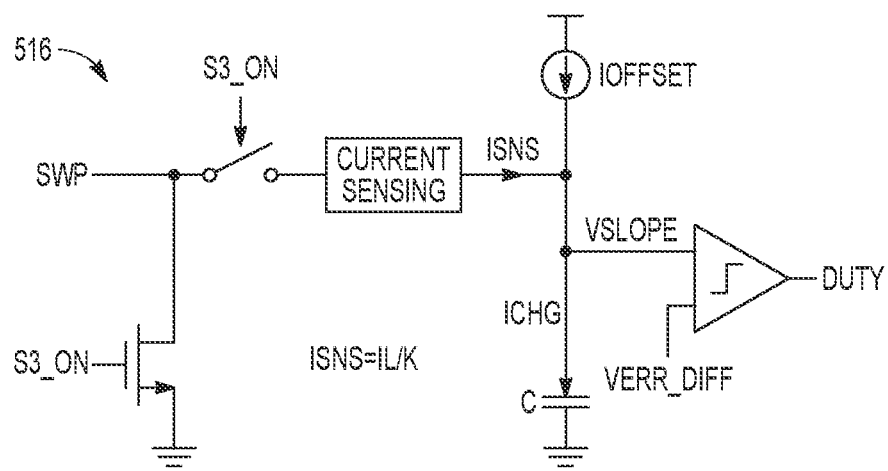
FIG. 5 is a circuit schematic of an example of a current sensing circuit.

FIG. 5 is a circuit schematic of an example of a current sensing circuit 516.

The voltage of circuit node SWP in FIG. 4 is sensed when switch S3 is turned on.

The average voltage of SWP is converted to current using a sensing field effect transistor (FET). The sensing FET is sized to be 1/K of the size of the S3 transistor, so the average sensed current is $I_L/K$.

The signal Vslope is the sawtooth reference signal used by the PWM circuit to set the duty cycle of the pulses used to control the switches Sn1 and Sp1, and $$V\text{slope} = (I_L/K + I\text{offset}) \ast (t/C).$$

The current Ioffset is a minimum current to provide stability in light load or no-load conditions. Changing Vslope changes the duty cycle modulation by the PWM circuit. The peak amplitude of the Vslope signal is Vpp and for significant circuit load $$V\text{pp} = (I_L K + I\text{offset}) \ast (Ts/C),$$

where Ts is the period of the sawtooth signal. For light circuit load conditions or no circuit load conditions $$V\text{pp} = (I\text{offset}) \ast (Ts/C),$$

to provide circuit stability.

For heavy circuit load, $I_L/K \gg$ Ioffset and Vpp is nearly proportional to inductor current $I_L$. Thus, the peak voltage Vpp is proportional to $I_L$ and the transfer function transfer function Fmd of the PWM circuit that includes the inverse of the peak voltage amplitude can be made inversely proportional to $I_L$ to make the loop GBW constant with inductor current.

Returning to the general case SIMO switching power converter circuit of FIG. 3, the output control loop circuits may each be active during a different activation time. For example, the feedback control is applied to the switching circuit elements of the control loop in a time sequence for independent control switching of the output control loop circuits. The feedback selection circuitry 312 selectively apply an output voltage and reference voltage to an error amplifier 308 during the activation time. The feedback control is applied to each output control loop in turn. The PWM circuit 314 of the output control loop circuit changes the peak voltage Vpp of the PWM control signal according to the value of $I_L$ sensed during the activation time that the output control loop circuit is activated.

In certain aspects, each output control loop circuit includes a current sensor 316 to monitor $I_L$ and the PWM circuit 314 of the output control loop circuit changes Vpp according to the output of its current sensor. In certain aspects, the switching power converter circuit includes one current sensor to monitor inductor current. For example, the current sensor may monitor the inductor current during activation of a switching circuit element of the common control loop circuit, such as switch S3 in the example of FIG. 5. Each of the output control loop circuits sets Vpp of the sawtooth reference signal to a value proportion to the sensed value of $I_L$ during its activation time.

Because the feedback applied by a particular output control loop circuit is active during a particular activation time, the GBW is adjusted for that particular output control loop during the period when the charging of the inductor is adjusted for that particular output control loop circuit.

The several examples of systems, devices, and methods described can be used to provide multiple regulated voltages. Using an $I_L$ dependent Vpp provides the regulation with reduced variation in GBW with load current. Compared to pulse width modulation using a fixed Vpp, using inductor current dependent Vpp provides GBW that stays constant with load current changing over a range from 100 milliamps (100 mA) to 1.2 amps (1.2 A). Additionally, using inductor current dependent phase modulation achieves improves phase margin and lowers cross regulation between outputs of a SIMO switching converter.

Additional Description and Aspects

A first Aspect (Aspect 1) can include subject matter (such as a switching power converter circuit) comprising a single inductive circuit element; a common control loop circuit coupled to a circuit input and the inductive circuit element and including switching circuit elements to charge the inductive circuit element using energy provided at the circuit input; at least one current sensing circuit configured to sense inductor current of the inductive circuit element; one or more output control loop circuits that each include switching circuit elements activated to generate an output voltage; and one or more pulse width modulation (PWM) circuits configured to generate a PWM control signal to activate the switching circuit elements of the output control loop circuits and to change a peak voltage of the PWM control signal of the one or more PWM circuits according to the inductor current.

In Aspect 2, the subject matter of Aspect 1 optionally includes one or more PWM circuits configured to set the peak voltage of the PWM control signal proportional to the sensed inductor current.

In Aspect 3, the subject matter of one or both of Aspects 1 and 2 optionally includes multiple output control loop circuits, each output control loop circuit including a PWM circuit configured to generate a PWM control signal for the output control loop circuit and change the peak voltage of the PWM control signal according to the sensed inductor current.

In Aspect 4, the subject matter of Aspect 3 optionally includes the multiple output control loop circuits each activated during different activation times to regulate the output voltage of the output control loop circuit; and the PWM circuit of an output control loop circuit is configured to change the peak voltage of the PWM control signal according to the sensed inductor current during the activation time that the output control loop circuit is activated.

In Aspect 5, the subject matter of Aspect 4 optionally includes at least one current sensing circuit configured to sense the inductor current during activation of a switching circuit element of the common control loop circuit.

In Aspect 6, the subject matter of Aspect 4 optionally includes each output control loop circuit including a current sensing circuit, and the PWM circuit of an output control loop circuit is configured to change the peak voltage of the PWM control signal according to the inductor current sensed by the current sensing circuit of the output control loop circuit.

In Aspect 7, the subject matter of Aspect one or any combination of Aspects 3-6 optionally includes each output control loop including an error amplifier configured to output a voltage proportional to an error between the output voltage of the output control loop and a reference voltage; and the PWM circuit of an output control loop circuit is configured to change the duty cycle of the PWM control signals according to the sensed inductor current and the error between the output voltage of the output control loop and the reference voltage.

In Aspect 8, the subject matter of one or any combination of Aspects 1-7 optionally includes at least one output control loop circuit that is a differential control loop circuit configured to generate both positive and negative output voltages.

Aspect 9 can include subject matter (such as a method of controlling operation of a single-inductor multiple-output switching power converter circuit) or can optionally be combined with one or any combination of Aspects 1-8 to include such subject matter, comprising charging an inductive circuit element using energy provided at an input port using a common control loop circuit; generating multiple output voltages using energy of the inductive circuit element using multiple output control loop circuits; activating switching circuit elements of the output control loop circuits according to pulse width modulation using a control signal to regulate an output voltage of each of the output control loop circuits; and changing a peak voltage of the control signal according to inductor current of the inductive circuit element.

In Aspect 10, the subject matter of Aspect 9 optionally includes activating the switching circuit elements of each output control loop circuit using an output loop control signal for each of the output control loop circuits, and independently changing the peak voltage of each of the output loop control signals according to the inductor current.

In Aspect 11, the subject matter of Aspect 10 optionally includes activating switching circuit elements of different output control loop circuits during different activation times; monitoring the inductor current of a first output control loop circuit during an activation time of the first output control loop circuit; and setting the peak voltage of an output loop control signal of the first output control loop circuit according to the inductor current determined during the activation time of the first output control loop circuit.

In Aspect 12, the subject matter of Aspect 11 optionally includes monitoring the inductor current using a separate current sensing circuit for each of the output control loop circuits.

In Aspect 13, the subject matter of one or any combination of Aspects 10-12 optionally includes monitoring the inductor current using a current sensing circuit during activation of a switching circuit element of the common control loop circuit; and changing the peak voltage of each of the output loop control signals according to the inductor current.

In Aspect 14, the subject matter of one or any combination of Aspects 10-13 optionally includes changing a duty cycle of the output loop control signals according to the sensed inductor current.

In Aspect 15, the subject matter of one or any combination of Aspects 9-14 optionally includes generating positive and negative output voltages using the multiple output control loop circuits.

In Aspect 16, the subject matter of one or any combination of Aspects 9-15 optionally includes setting the peak voltage proportional to the inductor current of the switching power converter circuit.

Aspect 17 can include subject matter (such as a single-inductor multiple-output (SIMO) switching power converter circuit) or can optionally be combined with one or any combination of Aspects 1-16 to include such subject matter, comprising a single inductive circuit element; a current sensing circuit configured to sense inductor current of the inductive circuit element; and multiple output control loop circuits coupled to the inductive circuit element and configured to generate positive and negative output voltages using energy stored in the inductive circuit element. Each output control loop circuit includes a pulse width modulator (PWM) circuit configured to regulate the output voltage of the output control loop circuit using a sawtooth reference signal; and set the peak voltage of the sawtooth reference signal to be proportional to the sensed inductor current.

In Aspect 18, the subject matter of Aspect 17 optionally includes control logic circuitry configured to activate the multiple output control loops sequentially; and the PWM circuit of an output control loop circuit configured to set the peak voltage of the sawtooth reference signal to be proportional to the inductor current sensed while the output control loop circuit is activated.

In Aspect 19, the subject matter of one or both of Aspects 17 and 18 optionally includes a common loop control circuit including switching circuit elements common to all the output control loop circuits; and a current sensing circuit configured to sense the inductor current when a switching element of the common loop control circuit is active.

In Aspect 20, the subject matter of one or any combination of Aspects 17-19 optionally includes a PWM circuit of an output control loop circuit configured generate a PWM control signal using the sawtooth reference signal and to change the duty cycle of the PWM control signal according to the sensed inductor current.

These non-limiting Aspects can be combined in any permutation of combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A switching power converter circuit, the circuit comprising:
   a single inductive circuit element;
   a common control loop circuit coupled to a circuit input and the inductive circuit element, the common control loop circuit including switching circuit elements to charge the inductive circuit element using energy provided at the circuit input;
   at least one current sensing circuit configured to sense inductor current of the inductive circuit element,
   one or more output control loop circuits, wherein each of the output control loop circuits includes switching circuit elements activated to generate an output voltage; and
   one or more pulse width modulation (PWM) circuits configured to generate a PWM control signal to activate the switching circuit elements of the output control loop circuits and to change a peak voltage of the PWM control signal of the one or more PWM circuits according to the inductor current.

2. The circuit of claim 1, wherein the one or more PWM circuits are configured to set the peak voltage of the PWM control signal proportional to the sensed inductor current.

3. The circuit of claim 1, including multiple output control loop circuits, each output control loop circuit including a PWM circuit configured to generate a PWM control signal for the output control loop circuit and change the peak voltage of the PWM control signal according to the sensed inductor current.

4. The circuit of claim 3, including:
wherein the multiple output control loop circuits are each activated during different activation times to regulate the output voltage of the output control loop circuit; and
wherein the PWM circuit of an output control loop circuit is configured to change the peak voltage of the PWM control signal according to the sensed inductor current during the activation time that the output control loop circuit is activated.

5. The circuit of claim 4, wherein the at least one current sensing circuit is configured to sense the inductor current during activation of a switching circuit element of the common control loop circuit.

6. The circuit of claim 4, wherein each output control loop circuit includes a current sensing circuit, and the PWM circuit of an output control loop circuit is configured to change the peak voltage of the PWM control signal according to the inductor current sensed by the current sensing circuit of the output control loop circuit.

7. The circuit of claim 3,
wherein each output control loop includes an error amplifier configured to output a voltage proportional to an error between the output voltage of the output control loop and a reference voltage; and
wherein the PWM circuit of an output control loop circuit is configured to change the duty cycle of the PWM control signals according to the sensed inductor current and the error between the output voltage of the output control loop and the reference voltage.

8. The circuit of claim 1, including at least one output control loop circuit that is a differential control loop circuit configured to generate both positive and negative output voltages.

9. A method of operating a single-inductor multiple-output switching power converter circuit, the method comprising:
charging an inductive circuit element using energy provided at an input port using a common control loop circuit;
generating multiple output voltages using energy of the inductive circuit element using multiple output control loop circuits;
activating switching circuit elements of the output control loop circuits according to pulse width modulation using a control signal to regulate an output voltage of each of the output control loop circuits; and
changing a peak voltage of the control signal according to inductor current of the inductive circuit element.

10. The method of claim 9, including:
activating the switching circuit elements of each output control loop circuit using an output loop control signal for each of the output control loop circuits; and
independently changing the peak voltage of each of the output loop control signals according to the inductor current.

11. The method of claim 10, including:
activating switching circuit elements of different output control loop circuits during different activation times;
monitoring the inductor current of a first output control loop circuit during an activation time of the first output control loop circuit; and
setting the peak voltage of an output loop control signal of the first output control loop circuit according to the inductor current determined during the activation time of the first output control loop circuit.

12. The method of claim 11, wherein monitoring the inductor current includes monitoring the inductor current using a separate current sensing circuit for each of the output control loop circuits.

13. The method of claim 10, including:
monitoring the inductor current using a current sensing circuit during activation of a switching circuit element of the common control loop circuit; and
changing the peak voltage of each of the output loop control signals according to the inductor current.

14. The method of claim 10, including changing a duty cycle of the output loop control signals according to the sensed inductor current.

15. The method of claim 9, wherein generating the multiple output voltages includes generating positive and negative output voltages using the multiple output control loop circuits.

16. The method of claim 9, wherein changing the peak voltage of the control signal includes setting the peak voltage proportional to the inductor current of the switching power converter circuit.

17. A single-inductor multiple-output (SIMO) switching converter circuit, the switching converter circuit comprising:
a single inductive circuit element;
a current sensing circuit configured to sense inductor current of the inductive circuit element;
multiple output control loop circuits coupled to the inductive circuit element and configured to generate positive and negative output voltages using energy stored in the inductive circuit element; and
wherein each output control loop circuit includes a pulse width modulator (PWM) circuit configured to:
regulate the output voltage of the output control loop circuit using a sawtooth reference signal; and
set the peak voltage of the sawtooth reference signal to be proportional to the sensed inductor current.

18. The switching converter circuit of claim 17, including:
control logic circuitry configured to activate the multiple output control loops sequentially; and
wherein the PWM circuit of an output control loop circuit is configured to set the peak voltage of the sawtooth reference signal to be proportional to the inductor current sensed while the output control loop circuit is activated.

19. The switching converter circuit of claim 17, including:
a common loop control circuit including switching circuit elements common to all the output control loop circuits; and
wherein the current sensing circuit is configured to sense the inductor current when a switching element of the common loop control circuit is active.

20. The switching converter circuit of claim 17, wherein the PWM circuit of an output control loop circuit is configured generate a PWM control signal using the sawtooth reference signal and to change the duty cycle of the PWM control signal according to the sensed inductor current.

* * * * *